US005956429A

United States Patent [19]
Burns

[11] Patent Number: 5,956,429
[45] Date of Patent: Sep. 21, 1999

[54] IMAGE DATA COMPRESSION AND DECOMPRESSION USING BOTH A FIXED LENGTH CODE FIELD AND A VARIABLE LENGTH CODE FIELD TO ALLOW PARTIAL RECONSTRUCTION

[75] Inventor: James Edward Burns, Basingstoke, United Kingdom

[73] Assignees: Sony Corporation, Tokyo, Japan; Sony United Kingdom Limited, Weybridge, United Kingdom

[21] Appl. No.: 08/903,963

[22] Filed: Jul. 31, 1997

[51] Int. Cl.[6] .............................. G06K 9/36; G06K 9/46
[52] U.S. Cl. .................. 382/245; 382/233; 382/250; 382/251; 358/261.1; 348/403; 341/63; 386/109
[58] Field of Search ................... 382/232, 233, 382/245, 309, 234, 250, 251; 371/37.01, 67.1, 2.1, 30, 31, 37.02, 37.05, 65, 71, 68.1; 386/2, 4, 5, 20, 27, 33, 40, 47, 109, 111, 112; 341/3, 5, 9, 60, 63, 67, 94, 95, 106; 348/845.1, 403; 358/261.1

[56] References Cited

U.S. PATENT DOCUMENTS 5,488,418   1/1996   Mishima et al. .......................... 348/398
5,606,421   2/1997   Suzuki et al. .............................. 386/33

*Primary Examiner*—Amelia Au
*Assistant Examiner*—F. E. Cooperrider
*Attorney, Agent, or Firm*—Frommer Lawerence & Haug, LLP.; William S. Frommer

[57] ABSTRACT

Image data decompression apparatus and method for receiving data words comprising a first sub-word and a second sub-word, at least some possible values of the first sub-word specifying a run of at least m instances of a predetermined data value, corresponding second sub-words specifying a number of instances of the predetermined data value in a range from at least m instances. The apparatus includes a first decoder for decoding the first sub-words to detect whether a current first sub-word specifies a run of at least m instances of the predetermined value, and a second decoder for decoding the second sub-words to generate output decoded data. The apparatus also includes a data counter for counting output decoded data from the second decoder, an adder, responsive to detection of a data error in a current second sub-word, for adding to a count of the data counter an amount corresponding to a lowest number m of instances of the predetermined data value specified by the corresponding first sub-word, and a partial code detector, responsive to a second sub-word having only a portion thereof corrupted by an error therein for detecting the number of instances of the predetermined data value more than the number of instances specified by the first sub-word indicated by an uncorrupted portion thereof, and for controlling the adder to add to the count of the data counter the number of instances specified by the uncorrupted portion of the second sub-word.

10 Claims, 11 Drawing Sheets

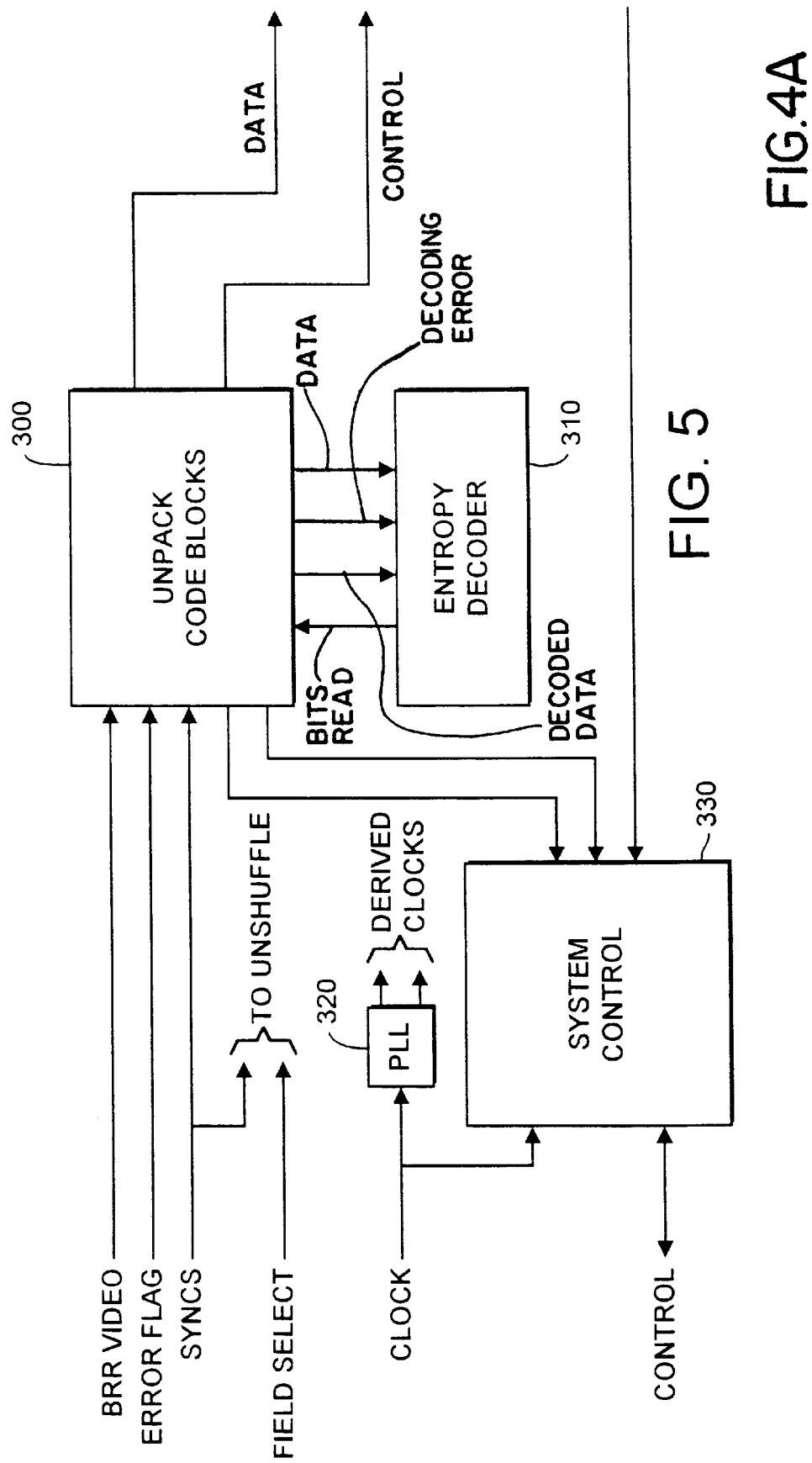
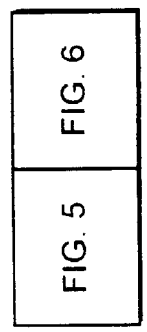
FIG. 5
FIG.4A
| FIG. 5 | FIG. 6 |

| AM | No OF BITS AVAILABLE FOR EACH AC |
|---|---|
| 00 | 0 |
| 01 | 1 |
| 10 | 2 |
| 11 | 3 |
FIG. 8
| AC | 6 | 4 | 2 | 0 | 1 | 3 | 5 | 7 |
|---|---|---|---|---|---|---|---|---|
| Q_mod | -14 | -10 | -6 | -2 | 2 | 6 | 10 | 14 |
FIG. 9
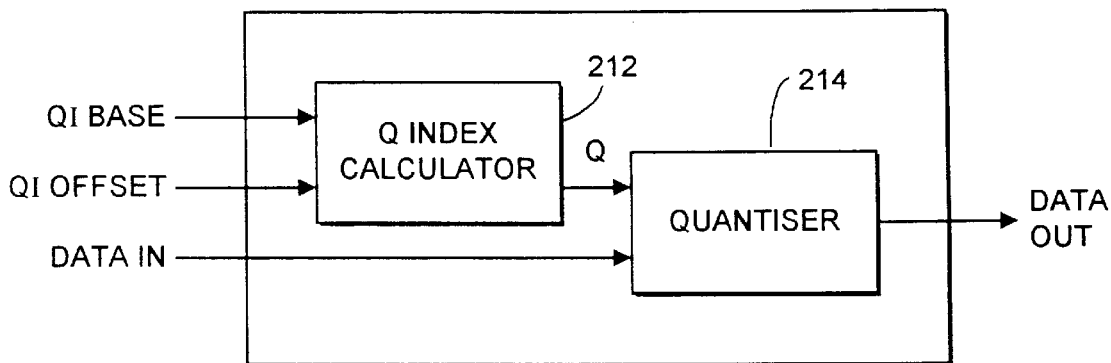
FIG. 10
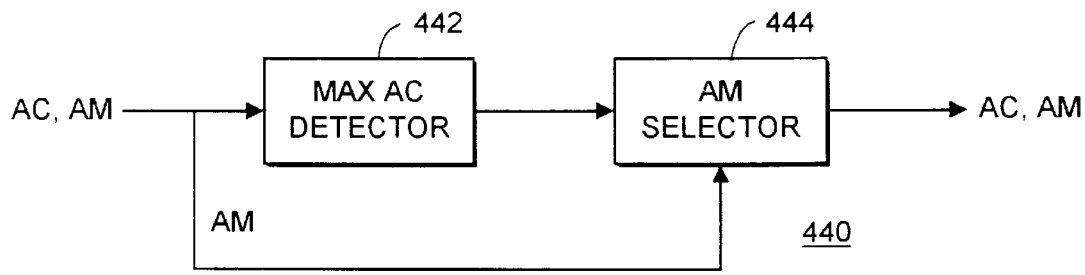
FIG. 11

| VLC | FLC |
|---|---|

FIG. 14A

| VLC | FLC |
|---|---|

FIG. 14B

| VLC | FLC |
|---|---|

↑
ERROR

FIG. 16A

| VLC | FLC |
|---|---|

↑
ERROR

IMAGE DATA COMPRESSION AND DECOMPRESSION USING BOTH A FIXED LENGTH CODE FIELD AND A VARIABLE LENGTH CODE FIELD TO ALLOW PARTIAL RECONSTRUCTION

BACKGROUND OF THE INVENTION

1. Field of the Invention

This invention relates to apparatus and methods for image data compression and decompression.

2. Description of the Prior Art

In some image data compression and decompression systems, one stage of the compression process is so-called run length and entropy encoding of the compressed data. A complementary run length and entropy decoding stage is performed at decompression.

Run length encoding involves identifying runs of a single data value (often zero) and replacing the run of data values with a single code giving the length of the run and (optionally) a terminating value.

Entropy encoding involves replacing commonly occurring bit patterns (particularly, commonly occurring data runs as mentioned above) in the compressed data with relatively short code words, and replacing less frequently occurring bit patterns in the compressed data with longer code words.

Overall, a significant and loss-less reduction in the quantity of compressed data can be achieved using these two techniques.

However, when the run length and entropy encoded code words are decompressed, even a small data error within a code word can mean that the code word cannot be decoded and so potentially a large amount of data cannot be recovered.

It is an object of the invention to provide an improved image data compression and/or decompression system.

SUMMARY OF THE INVENTION

This invention provides image data decompression apparatus for receiving data words comprising a first sub-word and a second sub-word, at least some possible values of said first sub-word specifying a run of at least m instances of a predetermined data value, corresponding second sub-words specifying a number of instances of said predetermined data value in a range from at least m instances, said apparatus comprising:

a first decoder for decoding said first sub-words to detect whether a run of at least m instances of said predetermined value is specified by a current first sub-word;

a second decoder for decoding said second sub-words to generate output decoded data;

a data counter for counting output decoded data from said second decoder; and an adder, responsive to detection of a data error in a second code word, for adding to a count of said data counter an amount corresponding to a lowest number m of instances of said predetermined data value specified by said corresponding first sub-word.

The invention addresses the problems described above by employing a two-part code word and decoding it in a novel way.

In the normal (error-free) course of events, a first part of each code word can specify a range of instances in a run of a predetermined data value (e.g. zero) from a minimum to a maximum number of instances, with a second part of each code word being capable of specifying the precise number of instances within that range.

If the first part of a code word is receivable but the second part is not (e.g. because of a data error), then at least the lower limit of the range of instances specified by the first part of that code word can be credited as output data and added to an output data count. This enables some useful data to be derived from the code word, even though the second part of the word is defective. In some cases, e.g. in a block-based system where a data block is declared invalid by an error detector if less than a threshold amount of data has been recovered for that block, embodiments of the invention can make the difference between declaring a data block invalid or valid, by taking the amount of received data for that block over a threshold amount.

The invention also provides image data compression apparatus comprising:

a data encoder operable to generate data words comprising a first sub-word and a second sub-word, at least some possible values of said first sub-word specifying a run of at least m instances of a predetermined data value in an input data signal, corresponding second sub-words specifying a number of instances of said predetermined data value in a range from at least m instances.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 5 and 6 schematically illustrate the corresponding decoder of FIG. 1;

FIG. 8 is a table showing the quantities of data required for different activity modes;

FIG. 9 is a table showing the effect of activity codes on the applied degree of quantisation;

FIG. 10 is a schematic diagram of a quantiser;

FIG. 11 schematically illustrates a part of a bit allocator;

FIGS. 14a and 14b schematically illustrate code words generated by an entropy encoder;

FIGS. 16a and 16b schematically illustrate errors occurring in code words of the general type shown in FIGS. 14a and 14b.

DESCRIPTION OF THE PREFERRED EMBODIMENTS

Figure 1:
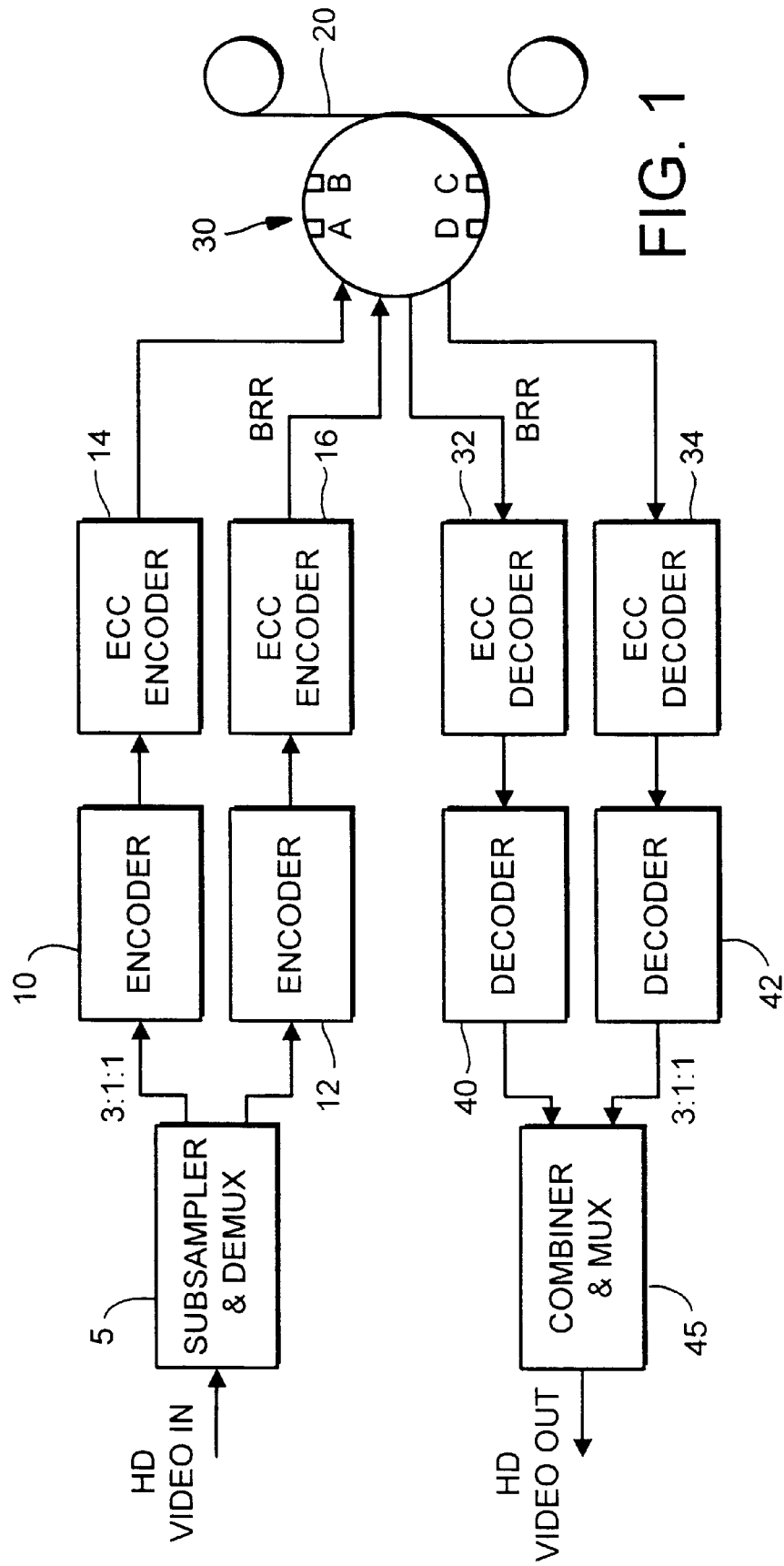
FIG. 1 is a schematic diagram of a bit-rate reducing encoder and a corresponding decoder for use with a magnetic tape channel.

FIG. 1 is a schematic diagram of a tape recording and reproducing system comprising a subsampler and demultiplexer 5, a pair of bit-rate reducing encoders 10, 12, error correction (ECC) encoders 14, 16, a tape channel 20, tape recording and reproducing apparatus (including rotary magnetic heads A.D) 30, error correction decoders 32, 34, a pair of corresponding data decoders 40, 42, and a combiner and multiplexer 45.

The subsampler and demultiplexer 5 receives an input 4:2:2 format high definition video signal, subsamples it to a 3:1:1 format and divides the resulting data into two for parallel processing by the encoders 10, 12. The encoders 10, 12 are identical, and each generate a bit-rate reduced (BRR) signal for recording on the tape medium. Similarly, the decoders 40, 42 receive BRR signals reproduced from the tape medium and decode the BRR signals to form respective portions of an output 3:1:1 video signal. The combiner and multiplexer 45 recombines these portions to form the output high definition video signal.

Figure 2:
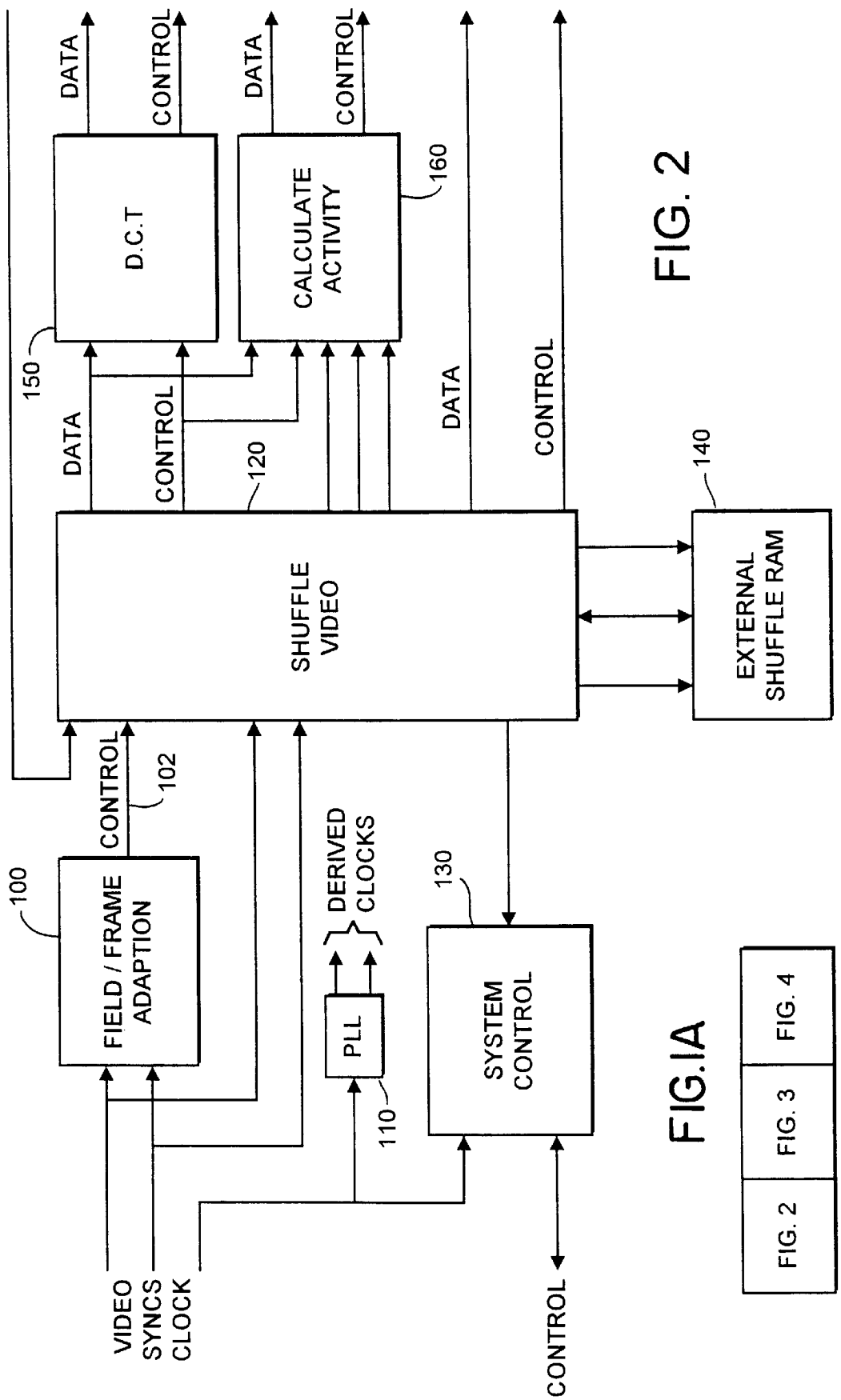
FIGS. 2 to 4 schematically illustrate the bit-rate reducing encoder of FIG. 1.

Referring now to FIG. 2, the input video signal to the encoder, in the so-called 3:1:1 format ($Y_0$ $Y_1$ $Y_2$ $C_b$ $C_r$ etc), a horizontal sync signal and a 46.4 MHz video clock are supplied to a field/frame adaption circuit 100, a phase lock loop 110, a video shuffler 120 and a system controller 130.

The field/frame adaption circuit 100 is used to control switching of the encoder between a frame-based mode of operation and a field-based mode of operation. This switching occurs at a scene change, so that a field-based mode of operation is used for the frame of a scene change.

In order to detect a scene change in the input video signal, the field/frame adaption circuit 100 divides each input field into 16 blocks, each being 300 pixels by 135 lines. The dc level and variance of each block for each field are then calculated as follows:

$$dc = \Sigma(\text{pixel value})$$

$$\text{variance} = \Sigma(\text{pixel value})^2$$

The variance of the blocks is then normalised as follows:

$$\text{normalised variance} = \Sigma(\text{pixel value})^2 / \Sigma(\text{pixel value})$$

The dc level and variance for each block of the two fields comprising a single frame are then compared (on a block-by-corresponding-block basis) to detect whether the two fields are considered to be similar. The following relationships are used to make this detection:

(a) if $dc_{fld1} \times dc_{lower\ threshold} > dc_{fld0}$ and $dc_{fld1} \times dc_{upper\ threshold} < dc_{fld0}$ then $dc_{fld1}$ is considered to be similar to $dC_{fld0}$ (b) if $var_{fld1} \times var_{lower\ threshold} > var_{fld0}$ and $var_{fld1} \times var_{upper\ threshold} < var_{fld0}$ then $var_{fld1}$ is considered to be similar to $var_{fld0}$ The number of dc and variance blocks that are similar between the two fields are then compared to separate thresholds:

if $\text{number\_similar}_{dc\ blocks} > dc$ block threshold and $\text{number\_similar}_{var\ blocks} > var$ block threshold then the two fields are considered to be part of the same video scene.

The result of this detection is supplied on a control output 102 from the field/frame adaption circuit 100.

The PLL 110 receives the 46.4 MHz clock supplied to the encoder and derives other clock signals required by the encoder apparatus from that clock signal.

The system controller 130 controls the apparatus to operate in the manner described.

The video shuffler 120 receives pixels of the input video signal and stores them temporarily in an external shuffle RAM 140. It then reads blocks of pixels from the external shuffle RAM according to a predetermined shuffle pattern so that blocks of pixels which are adjacent in the image are not read out at adjacent positions in the shuffle pattern.

The reason for this measure is to try to alleviate the effect of data losses (e.g. due to a tape drop-out or similar) on the picture reconstructed by the decoder apparatus. Because pixel blocks which are adjacent in the image are separated from one another in the resulting bit stream (because they are shuffled by the video shuffler 120), a short duration data loss might affect a number of pixel blocks but not their immediate neighbours in the image. This allows data concealment to be used to reconstruct the missing blocks.

The current frame is written to the external RAM while the previous frame is read, in a shuffled manner, from the external RAM.

Figure 3:
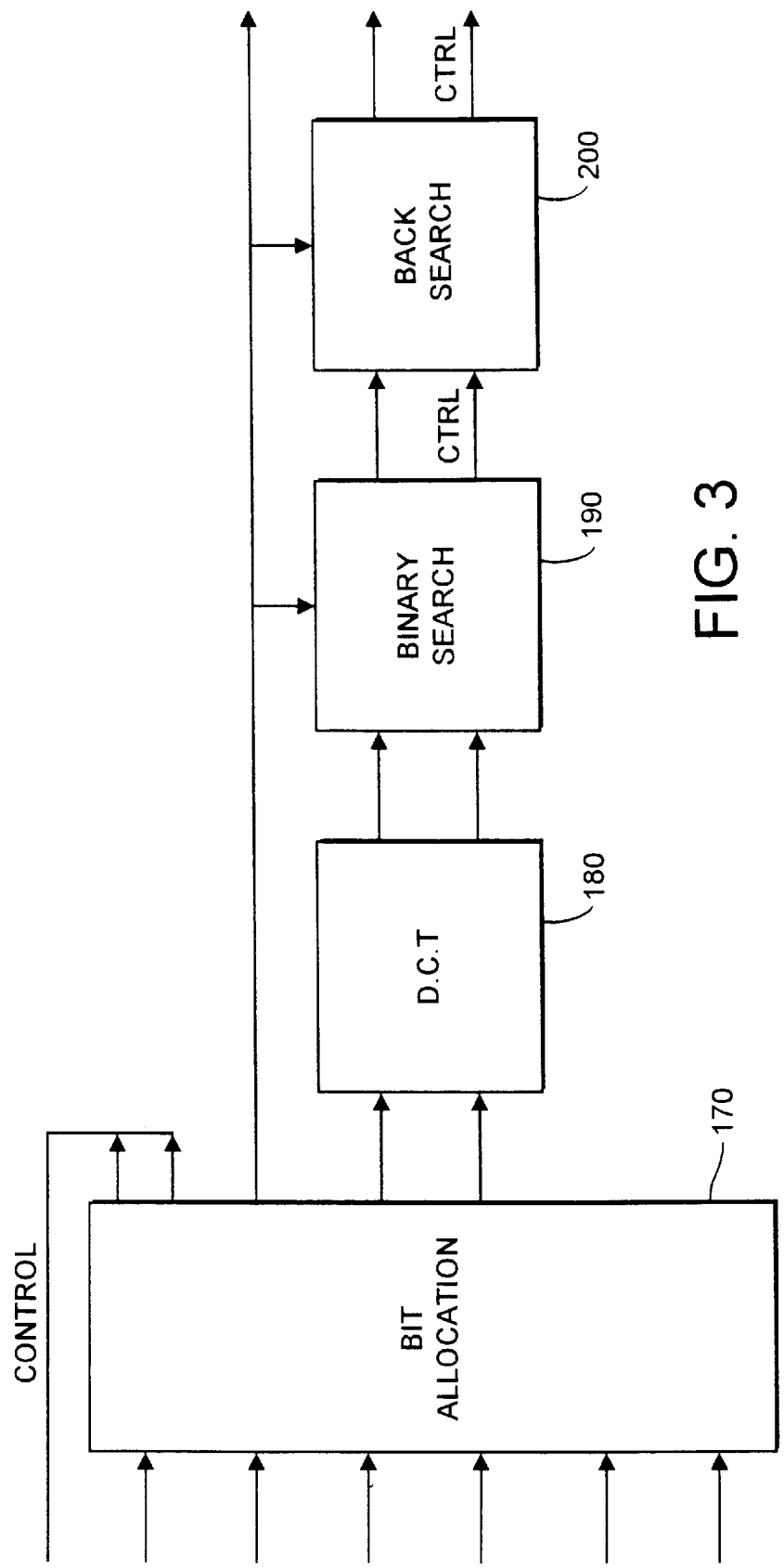

The shuffled data from the video shuffler 120 is supplied to a discrete cosine transform (DCT unit 150), an activity calculator 160 and (referring to FIG. 3) a bit allocator 170.

The DCT unit 150 transform each pixel block supplied from the video shuffler 120 into a corresponding block of DCT coefficients using known techniques. These coefficients are supplied to the bit allocator 170.

The activity calculator 160 generates so-called "activity codes" and corresponding offsets to be applied to the quantisation index for each block of data. These codes specify the so-called activity of each block, assessed according to the following principles:

(i) a block containing more detail (measured for example by the variance of the pixel values within the block) has a higher activity than a block having less detail;

(ii) a block predominantly containing colours associated with skin tones is quantised less harshly (i.e. given a lower notional activity) than a block predominantly not containing such colours;

(iii) a block having a very low or a very high average luminance level is quantised more harshly (i.e. given a higher notional activity) than a block having a mid-range average luminance level (Weber's law). For example, if a block's average luminance level is above 224 or below 32 (in an eight bit system) then a constant value is added to the calculation of the block's activity. If the block's average luminance level is between 32 and 224 then the activity calculation is unaltered.

In general, the activity codes are used to control the later operation of the encoder, so that pixel blocks having a higher activity are subjected to harsher compression, since it is less likely that the viewer would spot compression artifacts in that block when the block is subsequently decompressed. Blocks having a low activity, e.g. relatively "smooth" surfaces, relatively dark areas or areas having colours corresponding to skin tones, are compressed less harshly, since the user is more likely to spot compression artifacts in those areas.

The quantisation index offsets are embedded in the bitstream, whereas the activity codes (which are needed to specify the quantisation offsets to be used on decoding) are supplied separately for possible "optimisation"—see below.

The bit allocator 170 receives DCT data from the DCT encoder 150 and activity data from the activity calculator 160. The bit allocator 170 performs a trial quantization of the DCT data, followed by a trial part of an entropy encoding process.

Using these techniques, the bit allocator calculates the number of bits which would be required to encode each DCT block at one of ten quantization "base" values: 7, 13, 19, 25, 31, 37, 43, 49, 55 and 61, subject to each block's quantisation index offset calculated by the activity calculator. Ultimately, the quantization level for each block is selected to a resolution of 1 (using the scale given above), but for the purposes of the bit allocator 170, the quantization base value is assessed to the nearest 6 on that scale.

At the output of the bit allocator, therefore, a figure derived from the nearest appropriate quantization base level from the selection given above is passed, together with a delayed version of the video data, to a further DCV unit 180, a binary search unit 190 and a backsearch unit 200. This process will be described further below, but in brief, a value 2 greater than the quantisation value giving just over the required bit rate is passed by the bit allocator.

The further DCT unit 180 again calculates DCT coefficients, this time based on the delayed version of the video data.

The binary search unit 190 carries out trial quantizations at quantization levels just above or just below the base quantization level, again modified by the quantisation index offsets associated with each block, to select one value within a range of −3 to +4 with respect to the base quantization level from the bit allocator.

A further trial quantization is carried out by the backsearch unit which tests the quantization level selected by the binary search unit 190, and assesses whether a higher quantization level could be used whilst still obtaining the same or fewer quantisation errors.

Finally, the selected quantization level, and the DCT blocks from the further DCT encoder 180, are supplied to a quantizer 210 where they are quantized according to the selected quantization level. The quantized data are passed to an entropy encoder 220 which generates variable length output data according to the standard principles of entropy encoding, so that more commonly occurring data patterns in the quantized data are encoded using shorter code words.

The data generated by the entropy encoder is then packed into "code blocks" for recording on tape by a data packer 230. The code blocks include header data, entropy-encoded data from a number of DCT blocks, activity codes associated with those blocks and an indication of the quantisation level used in forming the blocks. Error correcting codes are then applied to provide error correction when the code blocks are replayed from the tape. A code block comprises five "sync blocks", where a sync block is the smallest separately recoverable data item recorded on the tape in this system. A sync block is illustrated schematically in FIG. 13 and is described further below.

Figure 6:
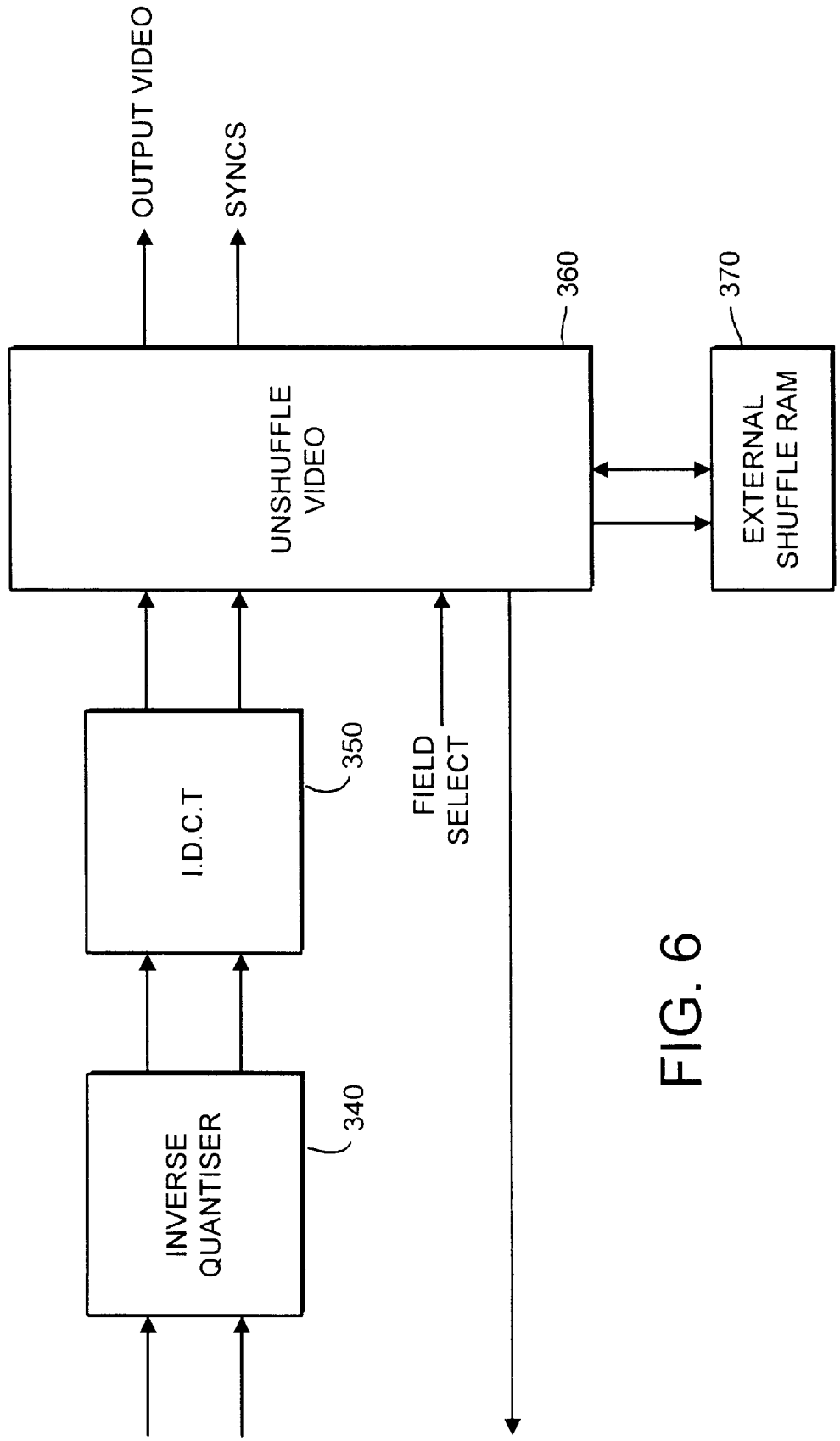

FIGS. 5 and 6 schematically illustrate the structure of the decoder 40 of FIG. 1.

Figure 4:
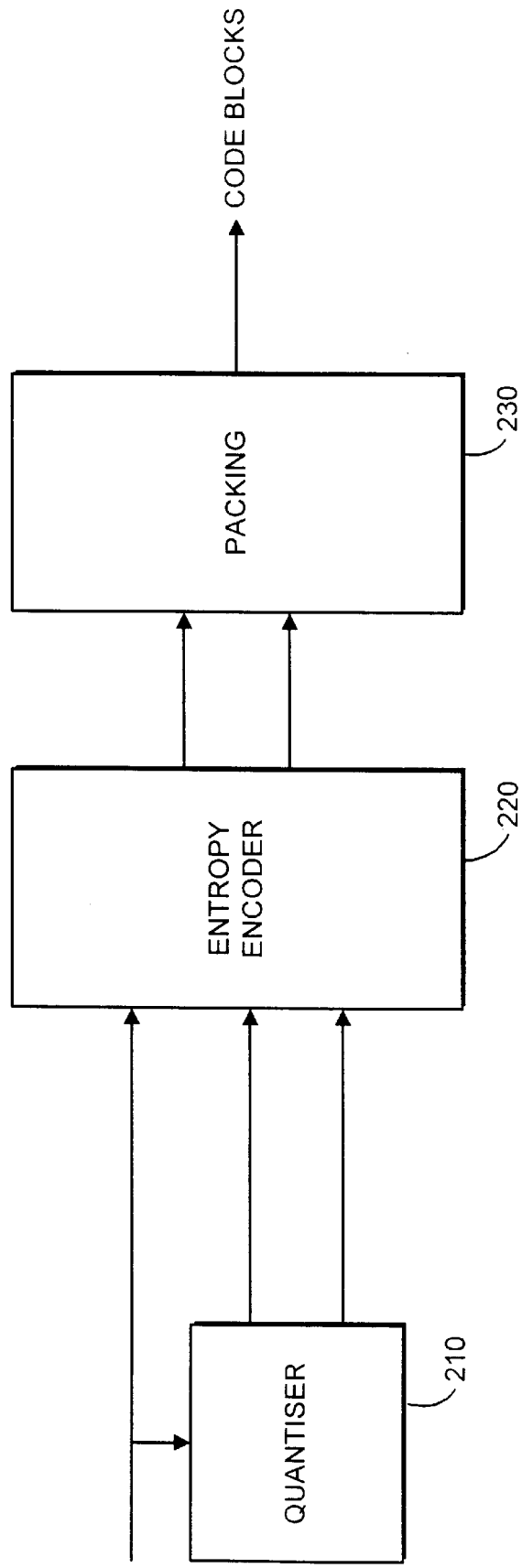

The bit-rate reduced (BRR) video, an error flag indicative of a data error in the BRR signal and horizontal and frame sync pulses are supplied to an unpacker 300. This operates in a complementary manner to the packer 230 of FIG. 4, to unpack individual DCT blocks (as entropy encoded) from the code blocks recovered from the tape. The unpacker forwards the entropy encoded data unpacked from the code blocks to an entropy decoder 310 where the DCT data is recovered.

A phase lock loop 320 receives a clocking signal associated with the input data and derives other clocking signals required by other parts of the decoding apparatus.

A system controller 330 controls the operation of the apparatus as described herein.

Turning now to FIG. 6, the entropy decoded DCT blocks are supplied to an inverse quantizer 340 where an inverse quantizing operation is carried out. The output from the inverse quantizer is supplied to an inverse DCT unit 350 where an inverse DCT operation is performed.

This generates blocks of image data, but in the shuffled order (by virtue of the shuffler 120 on the encoder 10. Therefore, an unshuffler 360 is used to recreate the correct image order of the pixel blocks. This is carried out by writing the pixel data to an external shuffle RAM 370 during one field or frame, and then reading it out in the correct order during the next field or frame. The output of the unshuffler 360 forms the output video signal and an associated sync signal.

Figure 7:
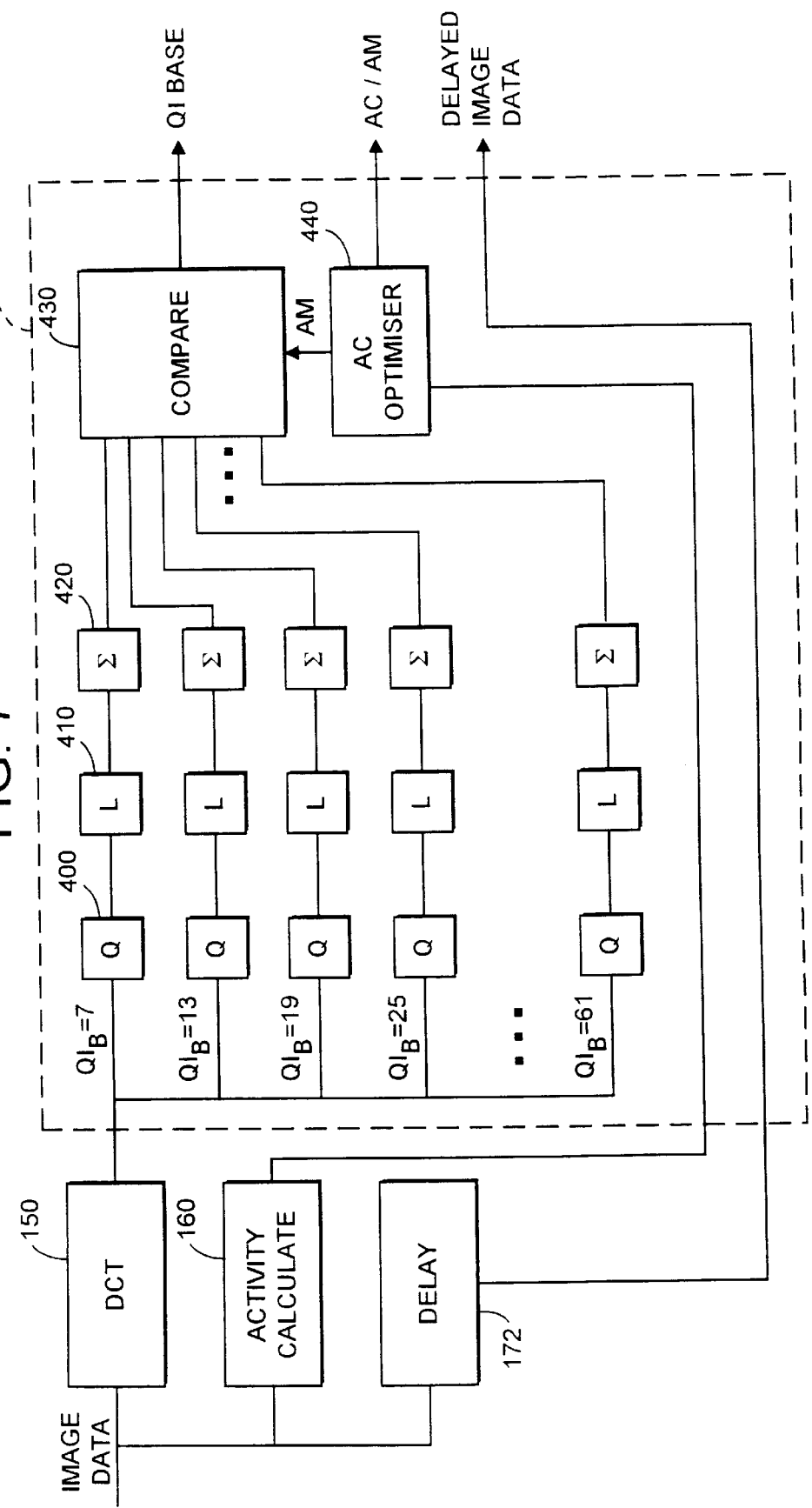
FIG. 7 schematically illustrates a bit allocator in more detail.

Referring now to FIG. 7, the operation of the bit allocator 170 will now be described in more detail.

The bit allocator 170 receives blocks of image data from the shuffler 120, DCT encoded data blocks from the DCT unit 150, and activity codes with an associated activity mode from the system controller. Activity modes and activity codes will be described in detail below with reference to FIGS. 8 and 9.

A delay unit 172 is provided (actually by the shuffler reading data later from the external shuffle RAM) for delaying the image data by the processing time of the bit allocator. Delayed image data is supplied for processing by later stages of the apparatus of FIG. 1, once the trial quantisation process of the bit allocator has been completed.

Figures 12, 13:
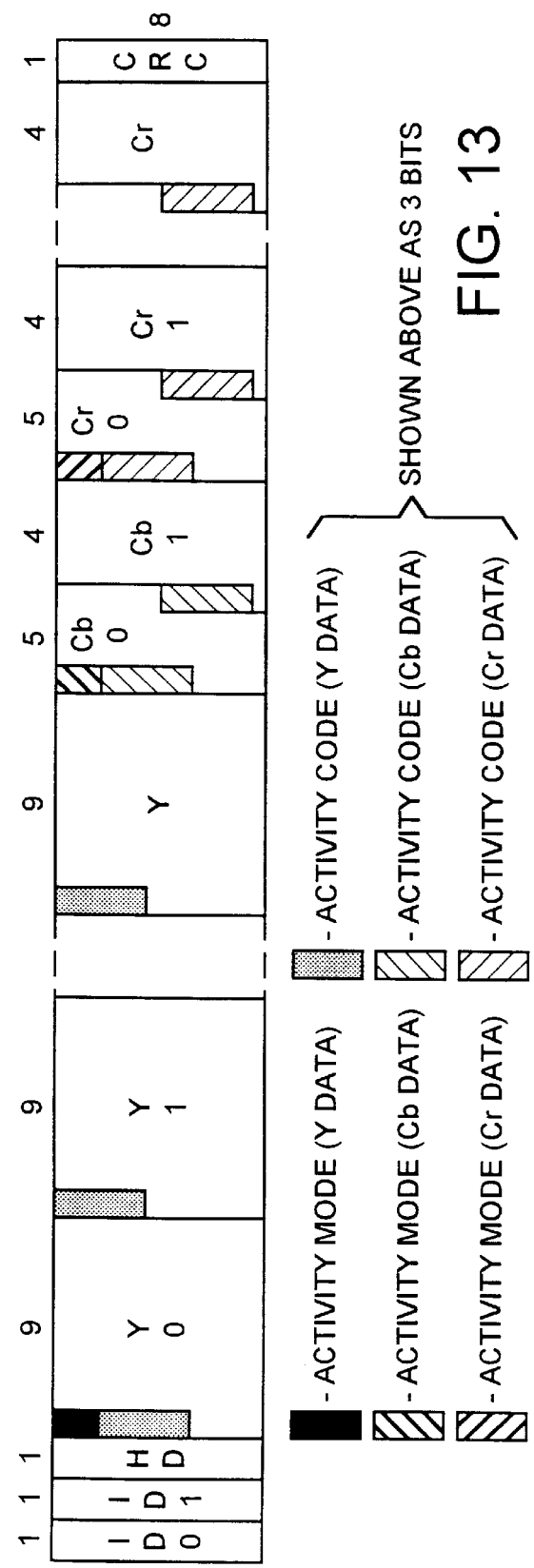
FIG. 12 schematically illustrates an optimisation process.
FIG. 13 illustrates the data format of a sync block.

The DCT blocks are supplied in parallel to a number of processing chains each comprising a trial quantiser 400, a length calculator 410 and a bit summer 420. Each of the processing chains carries out a trial compression of each DCT block according to one of ten quantization "base" values: 7, 13, 19, 25, 31, 37, 43, 49, 55 and 61. The results of each trial quantisation are supplied to the respective length calculator 410. This carries out a part of the processing associated with entropy encoding, in that it calculates the number of bits which would be required to entropy-encode that quantised data. These numbers of bits are summed by a summer for all of the DCT blocks within a code block. As mentioned above, a code block comprises five sync blocks, and a sync block, as illustrated in FIG. 13, is a data unit for recording onto tape, and comprises 9 luminance DCT blocks and 6 chrominance DCT blocks (3 Cb; 3 Cr).

After all of the DCT blocks of one code block have been processed in this way, the summed numbers of bits from the ten respective summers 420 are supplied to a comparator 430. This adds the amount of data needed to encode the activity codes for the DCT blocks (see below) to the outputs of the summers 420, and selects that value of the base quantisation level ($QI_{base}$) which gives a quantity of coded data nearest to but under the target size of a code block. That value of $QI_{base}$ is passed to the binary search unit and the backsearch unit for further processing as described above.

In parallel with the above processing, the optimisation of activity codes is being performed.

The apparatus can operate in one of four activity "modes", which determine the amount of data made available to specify the activity level of each DCT block. These activity modes are shown in FIG. 8, and vary from a mode in which no data is made available to specify the activity levels (AM=00) to one in which 3 bits per DCT block are made available (AM=11).

So, in AM=11, there are eight possible activity values which can be encoded by corresponding activity codes (AC). The effect of these activity values on the quantisation level used for the corresponding DCT block is illustrated in FIG. 9. Referring to FIG. 9, it can be seen that in AM=11, the actual quantisation applied to the DCT block can be modified by up to ±14 (on a scale—before modification by image activity—of about 1 to 64).

The initially selected activity mode is set by the user. The actual quantisation index offsets used in the activity mode are recorded onto tape as a look-up table, so that tapes recorded using different sets of offsets can be read by the same decoding apparatus.

In AM=10, two bits are available for each AC, so up to four values can be encoded. These values are not necessarily those shown for AC=0, 1, 2 and 3 in FIG. 9, but can be any values such as ±14 and ±6. Whatever the initially selected AM, a look-up table giving the correct quantisation index offsets to be used under that AM is written to tape—in fact, six times per frame.

Similarly, in AM=01, the available ACs are AC=0 and 1. In AM=00, only AC=0 is available.

The initial AM value is set by the user, and is used by the activity calculator 160 in generating activity codes to be associated with each DCT block. These codes will have 0, 1, 2 or 3 bits depending on the initially selected AM.

FIG. 10 illustrates the final quantiser 210 in more detail, and shows that the quantiser 210 receives the DCT data from the DCT unit 180, a quantisation base value from the backsearch unit 200 and the quantisation index offset (derived from the bitstream) for a current block. The AC and the $QI_{base}$ values are combined in a Q Index calculator 212, where the addition or subtraction specified for each AC by the table of FIG. 9 is carried out. The resulting quantisation value Q is applied to the DCT data by a quantiser unit 214.

The ACs are not used in the trial quantisation process carried out by the bit allocator 170. This allows the process of so-called AC optimisation to be carried out in parallel to the trial quantisations.

The ACs and the AM are supplied to an AC optimiser 440. The AM may be supplied explicitly or may be implied from the length of the ACs.

The AC optimiser is illustrated in more detail in FIG. 11.

The AC and AM values are received by a maximum AC detector 442 and an AM selector 444. The maximum AC detector detects (for Y, Cb and Cr blocks separately) the maximum AC value for that sync block. This information is passed to the AM selector which detects whether the number of bits required to encode that maximum value is fewer than the number of bits allowed by the current AM, and in fact is within the allocated number of bits of a lower AM. If this is true then the AM selector replaces the initially selected AM for that sync block with a replacement, lower AM. Also, the n-bit ACs prepared under the initially selected AM are replaced with m-bit ACs, where m<n. Effectively this is done by the entropy encoder ignoring one or more most significant bits of the ACs.

In fact, although a lower order AM is specified, resulting in a saving of one or more bits per DCT block in recording the ACs, the look-up table used to decode the ACs into quantisation index offsets will be the same as the look-up table for the initially selected AM. So, a two-bit AC under the initially selected AM=10 might well represent a quite different quantisation index offset to the same two bit AC under an AM that has been optimised from AM=11 down to AM=10, because in the latter case the look-up table for AM=11 will still be used.

FIG. 12 is a table schematically illustrating the AC optimisation process. The left-hand column of FIG. 12 lists the initial AM value. If the maximum AC value detected by the maximum AC detector 442 is one of the values shown in the centre column, then the AM for that sync block can be replaced by the "optimised" AM shown in the right-hand column, and the ACs encoded using fewer bits. Over a whole sync block, the savings made by this technique can provide a considerable extra amount of data capacity for encoding the image data itself.

FIG. 13 schematically illustrates a sync block, showing header information ("ID0", "ID1", "HD"), luminance DCT blocks (Y0, Y1 . . . ), chrominance DCT blocks (Cb0, Cb1 . . . Cr0, Cr1 . . . ) and an error checking byte ("CRC"). The AMs for Y, Cb and Cr are specified separately, at the beginning of respective Y, Cb and Cr data sections of the sync block. The ACs for each Y, Cb and Cr DCT block are then specified at the beginning of that DCT block's data.

FIGS. 14a and 14a schematically illustrate code words generated using the entropy encoder 220.

Each of the code words comprises a variable length code (VLC) and a fixed length code (FLC). As shown in FIGS. 14a and 14b, both the variable length code and the fixed length can be of different lengths from code word to code word. The reason why the terms "variable length" and "fixed length" are used is that the length of the fixed length code depends deterministically on the information which the code is to carry, so that as the amount of information increases, so the length of the code correspondingly increases. In contrast, the length of the variable length code is related to the frequency occurrence in a normal image of the information which the variable length code is to convey.

The variable length codes are chosen on the normal basis so that more frequently occurring bit patterns in the data to be encoded are represented by shorter VLCs; and less frequently occurring bit patterns are represented by longer VLCs.

The VLCs each specify a "group" for the following FLC. The identity of the group in turn specifies the number of bits to be expected as the corresponding FLC.

The various groups are shown in table 1 below. Basically, they fall into four categories:

Group 0: signifies an end of block (EOB) with no following data values;

Groups 1 to 6: signify a run of zeroes terminated by a data value of ±1;

Groups 7 to 12: signify a run of zeroes; and

Groups 13 to 21: signify a single data value other than 0 or ±1.

The VLCs (apart from in groups 0 and 7) specify ranges of possible values, with the choice from within the range being specified by the following FLC.

So, for example, a group 4 VLC signifies a run of between 8 and 15 zeroes terminated by ±1. The remaining information needed to complete the output data is:

(i) how many zeroes are there within the range of 8 to 15; and (ii) is the terminating value +1 or −1.

The number of zeroes between 8 and 15 is specified by 3 bits (8 possible values) of the following FLC, and the question of whether the terminating value is +1 or −1 is specified by a further 1 bit of the FLC. Therefore the FLC associated with a group 4 VLC requires 4 bits.

Similarly, a group 19 VLC specifies a single data value in a range from −127 to −64 or 64 to 127. One value from a total range of 128 must therefore be specified by the associated FLC, and therefore a 7 bit FLC (128 possible values) is needed.

Two exceptions were mentioned above. For a group 0 VLC, the VLC represents an EOB and no further information is needed; the corresponding FLC therefore comprises 0 bits. Similarly, a group 7 VLC specifies a single zero data value. Again, no further information is needed and so the corresponding FLC comprises 0 bits.

Table 2 below gives a worked example. In this example, the data stream is as follows:

1024,256,10,100,0,0,0,0,0,0,−1,1,5,0,0,0,0,3,2,1

The first four data values are encoded using VLCs from groups 13 to 21, with corresponding FLCs specifying individual values within the ranges specified by those VLCs.

There then follows a run of six zeroes terminated by −1. this is encoded using a VLC from group 3, followed by an FLC which specifies (i) that there are six zeroes rather than 4, 5 or 7 zeroes; and (ii) that the terminating value is −1.

The example then continues according to these rules. In the example, the actual bit patterns used for the VLCs are not material to the present invention and may be chosen according to standard rules.

TABLE 1

VLC Groups

| Group | AC Coefficient | Additional Bits |
|---|---|---|
| 0 | EOB | 0 |
| 1 | 0*1 ± 1 | 1 |
| 2 | 0*2 ± 1 ~ 0*3 ± 1 | 2 |
| 3 | 0*4 ± 1 ~ 0*7 ± 1 | 3 |
| 4 | 0*8 ± 1 ~ 0*15 ± 1 | 4 |
| 5 | 0*16 ± 1 ~ 0*31 ± 1 | 5 |
| 6 | 0*32 ± 1 ~ 0*63 ± 1 | 6 |
| 7 | 0*1 | 0 |
| 8 | 0*2 ~ 0*3 | 1 |
| 9 | 0*4 ~ 0*7 | 2 |
| 10 | 0*8 ~ 0*15 | 3 |
| 11 | 0*16 ~ 0*31 | 4 |
| 12 | 0*32 ~ 0*63 | 5 |
| 13 | −1, 1 | 1 |
| 14 | −3, −2, 2, 3 | 2 |
| 15 | −7 ~ −4, 4 ~ 7 | 3 |
| 16 | −15 ~ −8, 8 ~ 15 | 4 |
| 17 | −34 ~ 16, 16 ~ 31 | 5 |
| 18 | −63 ~ −32, 32 ~ 63 | 6 |
| 19 | −127 ~ −64, 64 ~ 127 | 7 |
| 20 | −255 ~ −128, 128 ~ 255 | 8 |
| 21 | −8,192 ~ −256, 256 ~ 8,191 | 14 |

In the above table, an expression such as:

0*8±1~0*15±1 signifies a run of between (~) 8 zeroes (8*0) and 15 zeroes (15*0) terminated by a data value of ±1.

TABLE 2

| | | Example | | | |
|---|---|---|---|---|---|
| Data | Group | VLC Code | VLC Length | FLC Code | FLC Length |
| 1024 | n/a | n/a | n/a | n/a | n/a |
| 256 | 21 | 1111111111111 | 13 | 00000100000000 | 14 |
| 10 | 16 | 11010 | 5 | 1010 | 4 |
| 100 | 19 | 11111111110 | 11 | 1100100 | 7 |
| 0 | n/a | n/a | 0 | n/a | 0 |
| 0 | n/a | n/a | 0 | n/a | 0 |
| 0 | n/a | n/a | 0 | n/a | 0 |
| 0 | n/a | n/a | 0 | n/a | 0 |
| 0 | n/a | n/a | 0 | n/a | 0 |
| 0 | n/a | n/a | 0 | n/a | 0 |
| −1 | 3 | 1111001 | 7 | 101 | 3 |

TABLE 2-continued

| | | Example | | | |
|---|---|---|---|---|---|
| Data | Group | VLC Code | VLC Length | FLC Code | FLC Length |
| 1 | 13 | 01 | 2 | 1 | 1 |
| 5 | 15 | 11101 | 5 | 101 | 3 |
| 0 | n/a | n/a | 0 | n/a | 0 |
| 0 | n/a | n/a | 0 | n/a | 0 |
| 0 | n/a | n/a | 0 | n/a | 0 |
| 0 | 9 | 111111101 | 9 | 00 | 2 |
| 3 | 14 | 0 | 1 | 11 | 2 |
| 2 | 14 | 01 | 2 | 10 | 2 |
| 1 | 13 | 00 | 2 | 1 | 1 |

So, from table 1 and the example of table 2, it can be seen that VLCs from groups 1 to 12 specify that there will be at least a minimum number of zeroes in the output data, even if the exact number (and, for groups 1 to 6, the terminating value) has yet to be specified by the corresponding FLC.

For example, if a group 5 VLC is received it can then be predicted that the output data will contain at least 16 zeroes, although the actual number (specified by the following FLC) can be between 16 and 31 zeroes.

Figure 15:
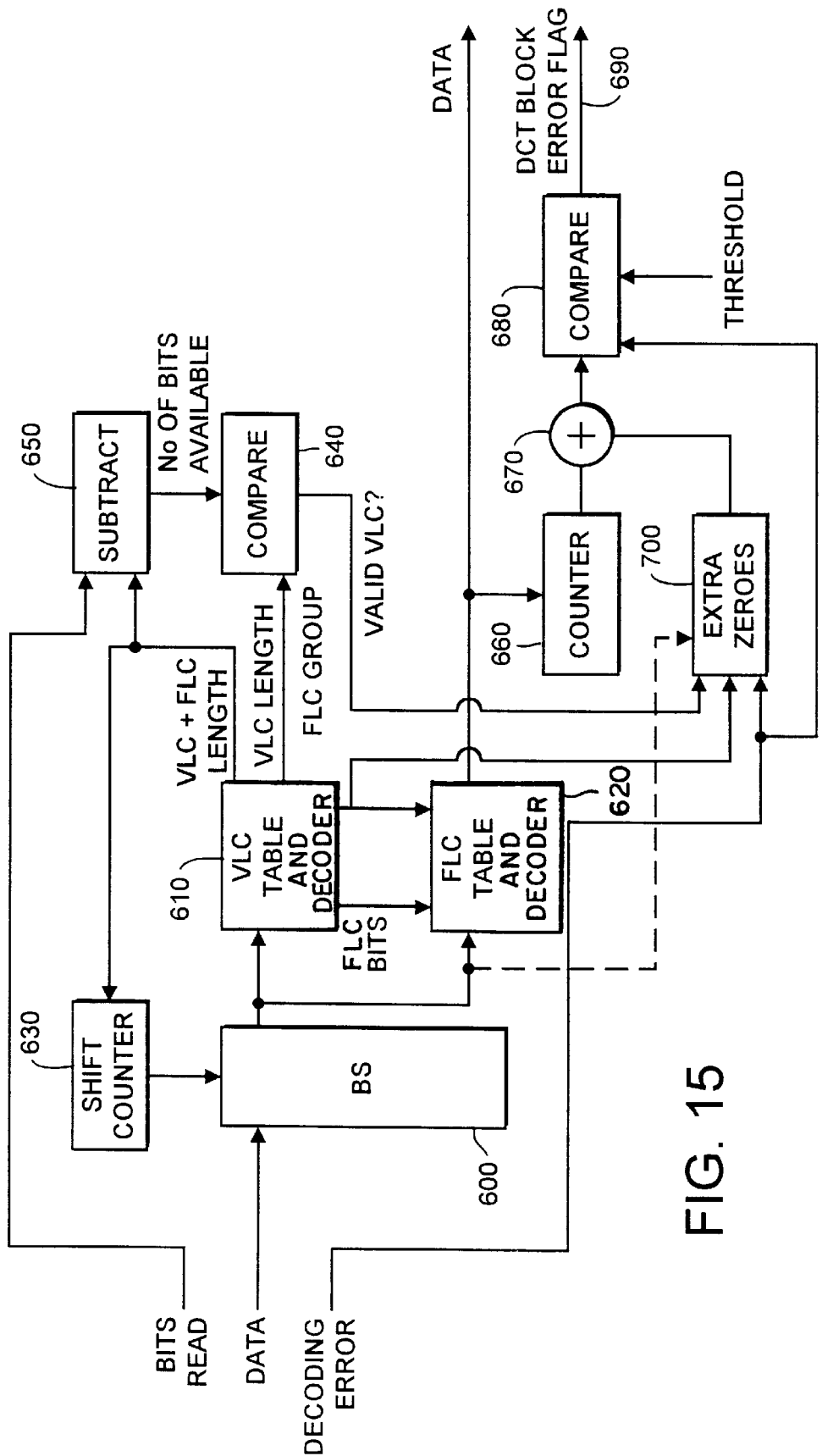
FIG. 15 is a schematic diagram of an entropy decoder.

FIG. 15 is a schematic diagram of the entropy decoder 310.

The entropy decoder 310 receives three signals from the tape channel, the associated error decoders 32, 34 and the unpacker 300. These signals are: the data to be decoded; a "decoding error flag" signal indicative of an error decoding or replay error; and a signal indicative of the number of bits of data which have been successfully read and error decoded.

The reproduced data is supplied to a barrel shifter 600 from where it is read out to a VLC table and decoder 610 and an FLC table and decoder 620 under the control of a shift counter 630, which provides read and write addresses for the barrel shifter 600. In operation, bits are read out from the barrel shifter to the VLC table 610 until a valid VLC has been recognised. This valid VLC is compared with a look-up table which provides the following information:

FLC group;

number of additional FLC bits.

From the number of bits of the VLC which have already been read and the number of bits of the FLC still to be read, the VLC table 610 generates the total length of the VLC and the FLC and sends that to the shift counter to control reading of the FLC from the barrel shifter 600 into the FLC table and decoder 620. The VLC table and decoder 610 also supplies the FLC group and the number of the FLC bits to the FLC table and decoder 620.

The FLC table and decoder 620 receives the FLC bits from the barrel shifter 600 and generates output data by comparing the FLC with a look-up table.

The output of the FLC table and decoder 620 is detected by a counter 660 which counts the number of bits generated in the output data. The number of bits for a complete DCT block is passed, via an adder 670 (to be described below) to a comparator 680, where it is compared with a threshold number of bits. If the number of bits of data generated for a DCT block exceeds the threshold, a block error flag 690 is not set. If the number of bits generated for a DCT block does not exceed the threshold and there has been a data error in the data representing the current DCT block, then the block error flag is set. The way in which the recovered data is treated by the DCT decoder and dequantizer downstream of the entropy decoder depends on whether the DCT block error flag is set.

The above description relates to operation when no decoding errors have been suffered, and the full amount of data needed to decode the VLC and the FLC is available. The techniques used to handle data errors in the FLC will now be described.

Firstly, when decoding of a DCT block of data fails because of data errors, the undecoded remainder of the block is padded by the FLC decoder with zero-valued data.

Further measures are as follows. The VLC table and decoder 610 supplies a signal representing the VLC length to a comparator 640. The comparator also receives from a subtracter 650 the difference between the number of bits which have been read out successfully and the cumulative VLC and FLC lengths for code words up to the code word preceding the current word. Therefore, the output of the subtracter 650 represents the number of bits available for the current VLC and FLC.

The comparator 640 detects whether the length of the current VLC exceeds the number of valid bits available, as supplied from the subtracter 650, and from this generates a "valid VLC" flag which indicates whether the current VLC is formed of valid (error-free) bits.

An "extra zero" detector 700 receives as inputs the decoding error flag, the FLC group (which in turn defines a minimum number of zeros in the decoded data) and the valid VLC flag from the comparator 640. If the decoding error flag indicates that there is an error in the current code word but the valid VLC flag indicates that the VLC part of the current code word is in fact valid, then the extra zero detector generates a value indicative of the minimum number of zeros associated with the current FLC group. So, for example, a group 5 VLC would indicate that at least 16 zeroes would result from the decoding of the associated FLC, had that been possible. Since the FLC group is derived from the VLC, that part of the information can be considered to be valid, even though the actual number of zeros (which would be represented by the content of the FLC) cannot be validly detected.

The number of zeros generated by the extra zero detector 700 is added to the output of the counter 660 by the adder 670 before the bit count is compared with the threshold by the comparator 680.

FIGS. 16a and 16b schematically illustrate the occurrence of data errors in code words to be decoded by the entropy decoder of FIG. 15.

In FIG. 16a, a data error occurs in the VLC part of the code word. This means that the VLC cannot be decoded and so the FLC group cannot be identified. No data is recoverable from this code word and no extra zeros can be accounted for by the extra zero detector 700.

In FIG. 16b, the VLC is validly decodable, to give the FLC group, but there is a data error in the FLC itself. Accordingly, from the FLC group specified by the VLC, a minimum number of zeros which would be specified by the FLC can be identified and added to the output of the counter 660.

In further embodiments, the extra zero detector can decode partially available FLCs. To do this, the extra zero detector receives the FLC data via the dotted path shown in FIG. 15.

The FLCs are transmitted in this embodiment most-significant-bit (MSB) first, so that if just a first part of an FLC is received, that part represents the MSB(s) of the FLC.

So, for example, if a group 3 VLC represents a run of zeroes of between 4 and 7 zeroes, the FLC associated with that VLC must specify a value of 4, 5, 6 or 7 for the run length of zeroes. These four possible values can be encoded using two bits, as follows:

| First two FLC bits | run length |
| --- | --- |
| 00 | 4 |
| 01 | 5 |
| 10 | 6 |
| 11 | 7 |

So, if the MSB of the FLC (the left-most digit in the above table) is all that is received, it can still be detected whether the minimum number of zeroes is 4 (for an MSB of 0) or 6 (if the MSB is 1).

The extra zero detector applies this principle (using a look-up table) to FLCs corresponding to groups 2 to 6 and 9 to 12, i.e. those groups where an FLC of two or more bits specifies the run length of zeroes.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Image data decompression apparatus for receiving data words comprising a first sub-word and a second sub-word, at least some possible values of said first sub-word specifying a run of at least m instances of a predetermined data value, corresponding second sub-words specifying a number of instances of said predetermined data value in a range from at least m instances, said apparatus comprising:

a first decoder for decoding said first sub-words to detect whether a current first sub-word specifies a run of at least m instances of said predetermined value;

a second decoder for decoding said second sub-word to generate output decoded data;

a data counter for counting output decoded data from said second decoder;

an adder, responsive to detection of a data error in a current second sub-word, for adding to a count of said data counter an amount corresponding to a lowest number m of instances of said predetermined data value specified by said corresponding first sub-word; and a partial code detector, responsive to a second sub-word having only a portion thereof corrupted by an error therein for detecting the number of instances of said predetermined data value more than said number of instances specified by said first sub-word indicated by an uncorrupted portion thereof, and for controlling said adder to add to said count of said data counter the number of instances specified by the uncorrupted portion of the second sub-word.

2. Apparatus according to claim 1, in which said first sub-word is a variable length code word.

3. Apparatus according to claim 1, comprising a data padder for substituting runs of said predetermined data value for said output decoded data when a data error in said second sub-words is detected.

4. Apparatus according to claim 1, comprising:

a detector for detecting whether each first sub-word is valid; and logic, responsive to a detection that a first sub-word is not valid, for inhibiting operation of said adder in relation to said invalid first sub-word.

5. Apparatus according to claim 1, in which a plurality of data words represent a block of data, said apparatus comprising:

a comparator for comparing said count generated by said counter in respect of data recovered in each data block with a threshold value; and an error flag generator for generating an error flag if said count generated by said counter in respect of data recovered in that data block does not exceed said threshold value.

6. Apparatus according to claim 1, in which said first sub-word is capable of specifying a range of between m and n instances of said predetermined data value, where n>m.

7. Apparatus according to claim 1, in which said data words represent image data.

8. Data recording/reproducing apparatus comprising:

a data encoder operable to generate data words comprising a first sub-word and a second sub-word, at least some possible values of said first sub-word specifying a run of at least m instances of a predetermined data value in an input data signal, corresponding second sub-words specifying a number of instances of said predetermined data value in a range from at least m instances;

a recording channel for recording data compressed by said data compression apparatus; and image data decompression apparatus for receiving data words comprising a first sub-word and a second sub-word, at least some possible values of said first sub-word specifying a run of at least m instances of a predetermined data value, corresponding second sub-words specifying a number of instances of said predetermined data value in a range from at least m instances, said apparatus comprising:

a first decoder for decoding said first sub-words to detect whether a current first sub-word specifies a run of at least m instances of said predetermined value;

a second decoder for decoding said second sub-words to generate output decoded data;

a data counter for counting output decoded data from said second decoder;

an adder, responsive to detection of a data error in a current second sub-word, for adding to a count of said data counter an amount corresponding to a lowest number m of instances of said predetermined data value specified by said corresponding first sub-word; and a partial code detector, responsive to a second sub-word having only a portion thereof corrupted by an error therein for detecting the number of instances of said predetermined data value more than said number of instances specified by said first sub-word indicated by an uncorrupted portion thereof, and for controlling said adder to add to said count of said data counter the number of instances specified by the uncorrupted portion of the second sub-word.

9. Apparatus according to claim 8, in which said recording channel is a magnetic tape channel.

10. A method of data decompression comprising the steps of:

receiving data words comprising a first sub-word and a second sub-word, at least some possible values of said first sub-word specifying a run of at least m instances of a predetermined data value, corresponding second sub-words specifying a number of instances of said predetermined data value in a range from at least m instances;

decoding said first sub-words to detect whether a current first sub-word specifies a run of at least m instances of said predetermined value;

decoding said second sub-words to generate output decoded data;

counting output decoded data from said second decoder;

in response to a detection of a data error in a current second sub-word, adding to said count of said data counting step an amount corresponding to a lowest number m of instances of said predetermined data value specified by said corresponding first sub-word; and in response to a second sub-word having only a portion thereof corrupted by an error therein, detecting the number of instances of said predetermined data value more than said number of instances specified by said first sub-word indicated by an uncorrupted portion thereof, and controlling said adder to add to said count of said data counter the number of instances specified by the uncorrupted -portion of the second sub-word.

* * * * *